(12) United States Patent
Gildas

(10) Patent No.: US 11,597,493 B2
(45) Date of Patent: Mar. 7, 2023

(54) AIRCRAFT DOOR WITH CIRCULAR TRANSLATION GUIDE

(71) Applicant: LATECOERE, Toulouse Occitaine (FR)

(72) Inventor: Martin Gildas, L'Union Occitanie (FR)

(73) Assignee: LATECOERE, Toulouse Occitanie (FR)

( * ) Notice: Subject to any disclaimer, the term of this patent is extended or adjusted under 35 U.S.C. 154(b) by 147 days.

(21) Appl. No.: 17/284,733

(22) PCT Filed: Oct. 16, 2019

(86) PCT No.: PCT/EP2019/078052
§ 371 (c)(1),
(2) Date: Apr. 12, 2021

(87) PCT Pub. No.: WO2020/079058
PCT Pub. Date: Apr. 23, 2020

(65) Prior Publication Data
US 2021/0323654 A1    Oct. 21, 2021

(30) Foreign Application Priority Data

Oct. 17, 2018  (FR) .................................. 1859591

(51) Int. Cl.
*B64C 1/14*  (2006.01)
(52) U.S. Cl.
CPC ............ *B64C 1/1461* (2013.01); *B64C 1/143* (2013.01)

(58) Field of Classification Search
CPC .............................. B64C 1/1461; B64C 1/143
See application file for complete search history.

(56) References Cited

U.S. PATENT DOCUMENTS

| | | | | |
|---|---|---|---|---|
| 3,004,303 A | * | 10/1961 | Wilmer ..................... | B64C 1/14 49/249 |
| 4,720,065 A | * | 1/1988 | Hamatani ............... | B64C 1/143 244/905 |
| 5,289,615 A | * | 3/1994 | Banks ..................... | B64C 1/143 244/905 |
| 6,742,744 B2 | * | 6/2004 | Schreitmueller ..... | B64C 1/1407 244/129.5 |

(Continued)

FOREIGN PATENT DOCUMENTS

| | | |
|---|---|---|
| DE | 4305032 | 5/1994 |
| DE | 19930322 | 11/2000 |

(Continued)

*Primary Examiner* — Tien Q Dinh
*Assistant Examiner* — Katherine June Bolek
(74) *Attorney, Agent, or Firm* — Defillo & Associates, Inc; Evelyn A Defillo

(57) ABSTRACT

Aircraft door (1) including an opening (4), a frame (3), a hinge structure (5) and a circular translation guide device designed to maintain the orientation of the opening (4) during the opening or closing thereof. The hinge structure (5) is connected to the opening (4) by a lifting arm (8) allowing a lifting movement of the opening (4) relative to the hinge structure (5). The circular translation guide device includes a single link (11) connected to the frame (3) by one of the ends thereof and by the other of the ends thereof to a lever (13) which is attached to the hinge structure (5).

9 Claims, 4 Drawing Sheets

(56) References Cited

U.S. PATENT DOCUMENTS

| | | | | |
|---|---|---|---|---|
| 7,578,476 B2 * | 8/2009 | Wiers | ............... | B64C 1/143 244/129.5 |
| 2002/0096602 A1 * | 7/2002 | Dazet | ............... | B64C 1/143 244/129.5 |

FOREIGN PATENT DOCUMENTS

| | | |
|---|---|---|
| EP | 0257699 | 3/1988 |
| FR | 2975967 | 12/2012 |

\* cited by examiner

AIRCRAFT DOOR WITH CIRCULAR TRANSLATION GUIDE

CROSS REFERENCE TO RELATED APPLICATION

This application is a national stage entry of PCT/EP2019/078052 filed Oct. 16, 2019, under the International Convention and claiming priority over French Patent Application No. 1859591 filed Oct. 17, 2018.

TECHNICAL FIELD

The invention deals with the field of aeronautics and relates to an aircraft door.

Aircraft doors generally comprise an opening leaf which is movable relative to a frame intended to be fastened to the fuselage of the aircraft. During flight, the opening leaf is locked to the frame, whereas during passenger or equipment embarking or disembarking phases, on the ground, the opening leaf is separated from the frame and is disengaged at least partially from the opening formed by the frame by virtue of a hinge structure which supports and guides the movement of the opening leaf relative to the frame.

Aircraft doors generally implement a circular-translation guide device designed to maintain the orientation of the opening leaf while it is opening or closing, such that the opening leaf in an open position is substantially parallel to the opening leaf in a closed position. This makes it possible in particular for the opening leaf, when it is in the open position, to be positioned on the outside of the aircraft, against the fuselage thereof.

PRIOR ART

A number of solutions for implementing a circular-translation guide device in an aircraft door are known.

Document FR2975967 describes an aircraft door mechanism comprising a hinge structure connected on one side to the frame by a first pivot connection and connected on the other side to the opening leaf by a second pivot connection. The conjoint rotation of the first pivot connection and the second pivot connection is brought about by the use of a roller chain that connects two sprockets fastened respectively to one and the other of these pivot connections, such that the rotation of the hinge structure about the first pivot connection drives the same rotation of the opening leaf relative to the hinge structure about the second pivot connection. The two pivot connections of the hinge structure are thus indexed and, by virtue of this, the opening leaf has an opening movement in circular translation. This commonly used solution serves to keep the opening leaf in the same orientation while it is opening or closing. However, the use of a roller chain and sprockets requires complex and expensive devices, which are sources of malfunctions and require maintenance, in order to guide the chain, to regulate and maintain its tension at a sufficient value, to align the sprockets and the chain in one and the same plane, and to lubricate these mechanical elements.

Also known are aircraft doors comprising a hinge structure which supports the opening leaf relative to the frame during the opening or closing movement of the opening leaf and also comprising a circular-translation guide device formed by two rods fastened at one of their ends to the frame of the door and fastened at the other of their ends to the top part of the opening leaf. The two rods, and the four corresponding supports, form a deformable parallelogram between the opening leaf and the frame of the door. This deformable parallelogram guides the opening leaf in a circular translational movement during the opening and closing movements performed by the hinge structure. The deformable parallelogram formed by the two rods is generally situated on the top part of the door and, for safety and esthetic reasons, needs to be concealed by a panel when the opening leaf of the door is closed. A complex mechanism is therefore necessary to automatically position this panel which conceals the rods when the door is closed, and to automatically retract this panel and allow the movement of the rods when the door is being opened. Moreover, the space taken up by the deformable parallelogram limits the free passage that is available when the opening leaf is open. Since this free passage is regulated, the doors that use such a system require a larger cutout in the fuselage of the aircraft in order to attain the minimum free passage defined by the regulations.

SUMMARY OF THE INVENTION

The invention aims to improve the aircraft doors of the prior art.

To this end, the invention concerns an aircraft door comprising:
  an opening leaf;
  a frame intended to be fastened to the fuselage of the aircraft;
  a hinge structure supporting the opening leaf relative to the frame, this hinge structure being connected on one side to the frame by a first pivot connection, and being connected on the other side to the opening leaf by a second pivot connection, the axis of the first pivot connection being parallel to the axis of the second pivot connection, the opening leaf thus being able to pivot relative to the hinge structure via the second pivot connection and the hinge structure being able to pivot on the frame via the first pivot connection, such that the opening leaf is movable between a closed position, in which the opening leaf is in the frame, and an open position, in which the opening leaf is open and positioned facing the fuselage of the aircraft, clearing the opening of the frame;
  a circular-translation guide device designed to maintain the orientation of the opening leaf while it is opening or closing.

In this aircraft door:
  the hinge structure is connected to the opening leaf via a lifting arm which allows a lifting movement of the opening leaf relative to the hinge structure;
  the circular-translation guide device comprises a single connecting rod connected to the frame by one of its ends via a third pivot connection, the axis of which is parallel to the axis of the first pivot connection and is separate from this axis, the single connecting rod being connected by the other of its ends to a lever by a fourth pivot connection, the axis of which is parallel to the axis of the first pivot connection and to the axis of the third pivot connection;
  the lever is attached to the hinge structure via the second pivot connection, by its opposite end from the fourth pivot connection;
  the lever extends in a first direction and comprises a first shaft extending in a second direction which is parallel to the first direction and coincides with the axis of the second pivot connection, the hinge structure being mounted on this first shaft so as to be pivotable relative to the opening leaf;

the lever comprises a second shaft extending perpendicularly to the axis of the second pivot connection, the lifting arm being mounted in a rotatable manner on this second shaft.

The invention makes it possible to realize the circular-translation guide of the opening leaf in a reliable manner, while interfering very little with the free passage formed by the opening leaf in the open position. The single connecting rod is a simple and compact mechanism which ensures the guidance in circular translation of the opening leaf. Few moving pieces are required to form this circular-translation device, which is preferably positioned in a compact manner as close as possible to the hinge structure. Maximization of the free passage of the door is thus obtained.

The invention is furthermore particularly advantageous in the case of doors in which the opening leaf is lifted. Specifically, certain aircraft doors are locked, in the closed position, by a lowering movement of the opening leaf relative to the frame, which makes it possible for the stops that are present on the edge of the opening leaf to be locked against counter-stops that are present on the frame of the door. When the opening leaf is being opened, the opening leaf is made to move in a rising manner such that the stops of the opening leaf are unlocked from the counter-stops of the frame, in order then to allow the action of the hinge structure to open the opening leaf. In this configuration, the single connecting rod of the circular-translation device acts advantageously on the arms that connect the hinge structure to the opening leaf and allow this lifting movement. An articulated connection combining the pivots and making it possible to both lift the opening leaf and guide it in circular translation can thus be advantageously implemented.

The aircraft door may comprise the following additional features, individually or in combination:

the lever extends in a first direction and comprises a first shaft extending in a second direction which is parallel to the first direction and coincides with the axis of the second pivot connection, the hinge structure being mounted on this first shaft so as to be pivotable relative to the opening leaf;

the hinge structure is connected to the opening leaf via a lifting arm that allows a lifting movement of the opening leaf relative to the hinge structure, and in that the lever comprises a second shaft extending perpendicularly to the axis of the second pivot connection, the lifting arm being mounted in a rotatable manner on this second shaft;

the lifting arm is connected to the opening leaf by a pivot connection perpendicular to the axis of the second pivot connection;

the second shaft is fastened to the first shaft, the first shaft and the second shaft being arranged in a cross shape;

the hinge structure comprises two tabs, each equipped with a pivot, these two pivots being aligned and forming the second pivot connection;

the lever cooperates with the one of said pivots;

the distance between the axis of the first pivot connection and the axis of the third pivot connection is equal to the distance between the axis of the second pivot connection and the axis of the fourth pivot connection;

the hinge structure and the single connecting rod each comprise a bend for avoiding the frame when the opening leaf is in the open position;

the single connecting rod comprises an angled section at its end which is connected to the lever;

the lever, the first shaft and the second shaft are made in one piece.

PRESENTATION OF THE FIGURES

Further features and advantages of the invention will become apparent on reading the non-limiting description which follows, with reference to the appended drawings, in which.

DETAILED DESCRIPTION

Figure 1:
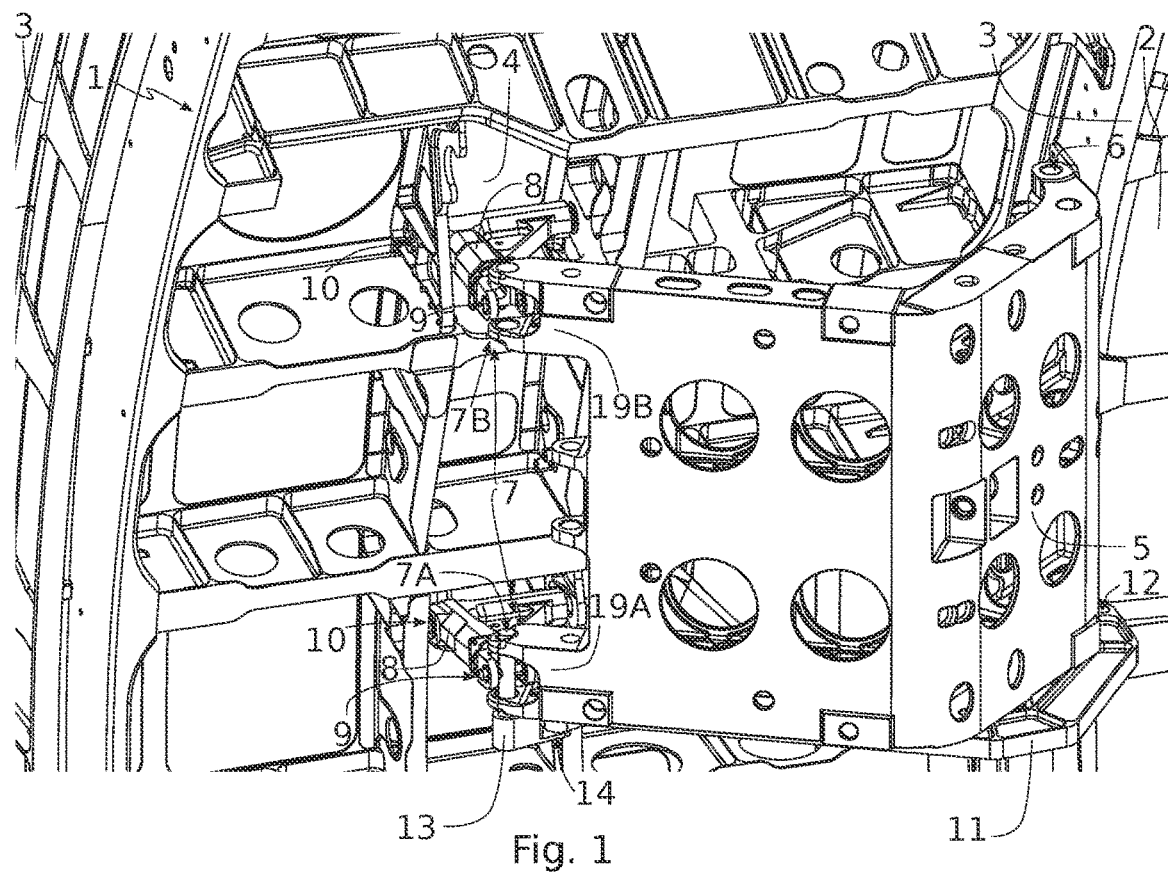
FIGS. 1 and 2 show perspective views of a portion of an aircraft door according to the invention, seen respectively in a top-down view and a bottom-up view.
Figure 2:
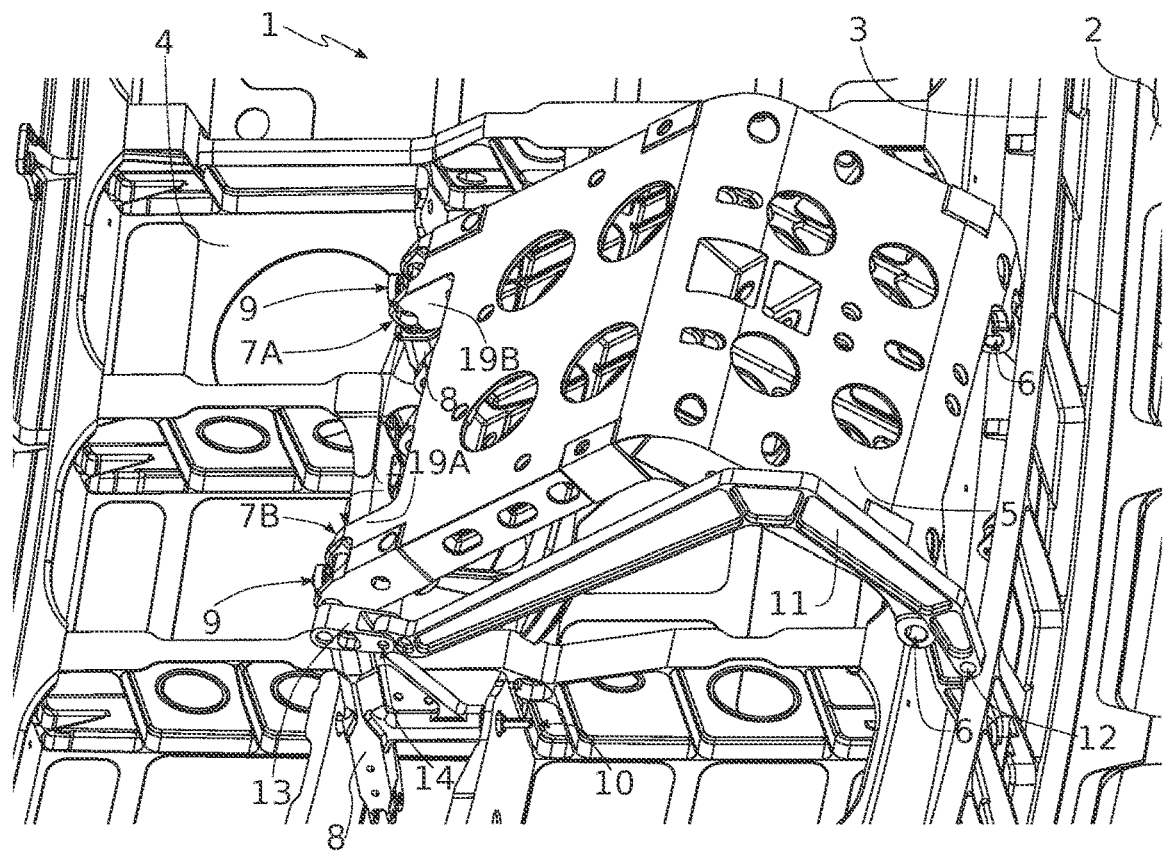

FIGS. 1 and 2 show a door 1 in place in an aircraft. In these views, the door is in a closed position and thus extends the fuselage 2 of the aircraft.

The aircraft door 1 comprises a frame 3 which is fastened to the fuselage 2 of the aircraft, and an opening leaf 4 which is connected to the frame 3 in an articulated manner to allow the door to be opened.

The door 1 also comprises a hinge structure 5 which is intended to support the opening leaf 4 relative to the frame 3 and to allow the opening or closing movement of the opening leaf 4 relative to the frame 3. This hinge structure 5 is generally a bulky mechanical part since it has to support the weight of the opening leaf 4 when the latter is separated from the frame 3 in the process of opening and in the completely open position. The hinge structure 5 is realized here, in a known manner, by an assembly of metal sheets and structural parts which are machined and comprise perforations in order to limit the weight of the hinge structure 5 given the bulkiness thereof. The hinge structure 5 is connected on one side to the frame 3 by a first pivot connection 6 and is connected on the other side to the opening leaf 4 by a second pivot connection 7. Given the mass of the opening leaf supported by the hinge structure 5, which also has an overhang, these pivot connections are advantageously realized by long guides or by a number of pivots aligned along the same axis. In the present example, the two pivot connections 6, 7 are each realized by two aligned pivots.

The axes of the first pivot connection 6 and of the second pivot connection 7 are parallel and, in this example, are substantially vertical. The hinge structure 5 is connected to the opening leaf 4 via two lifting arms 8. The two pivot connections 6, 7 allow the hinge structure 5 to support the opening leaf 4 during its opening or closing movement while the two lifting arms 8 allow a lifting or lowering movement of the opening leaf 4 that makes it possible to disengage or engage the opening leaf 4 from or with the frame 3. Specifically, in a known manner, stops and corresponding counter-stops (not shown) are positioned respectively on the edge of the opening leaf 4 and on the frame 3, such that, when the opening leaf 4 is positioned against the frame 3 while the door 1 is being closed, the opening leaf 4 is then engaged with the frame 3 by a lowering movement. Conversely, in order to open the door 1, the opening leaf 4 is firstly made to move with a lifting movement for disengaging it from the frame 3. The two lifting arms 8 thus allow this lifting or lowering movement of the opening leaf 4, which is necessary to disengage or engage the door 1.

The lifting arms 8 are attached, by one of their ends, to the hinge structure 5 by a pivot connection 9 with a substantially horizontal axis and are connected by the other of their ends to the opening leaf 4 by a pivot connection 10, which likewise has a substantially horizontal axis. The axes of these pivot connections 9, 10 are perpendicular to the axis of the second pivot connection 7.

In the present example, the second pivot connection 7, which allows the opening leaf 4 to be able to pivot relative to the hinge structure, is realized by two pivots 7A, 7B carried by two tabs 19A, 19B of the hinge structure 5. Each tab 19A, 19B comprises a bore that cooperates with a shaft, the axis of which coincides with the axis of the second pivot connection 7.

With reference to FIG. 2, the door 1 also comprises a circular-translation guide device for maintaining the orientation of the opening leaf 4 while it is opening or closing. This device comprises a single connecting rod 11, one of the ends of which is attached to the frame 3 by a third pivot connection 12, and the other end of which is attached to a lever 13 by a fourth pivot connection 14.

Figure 3:
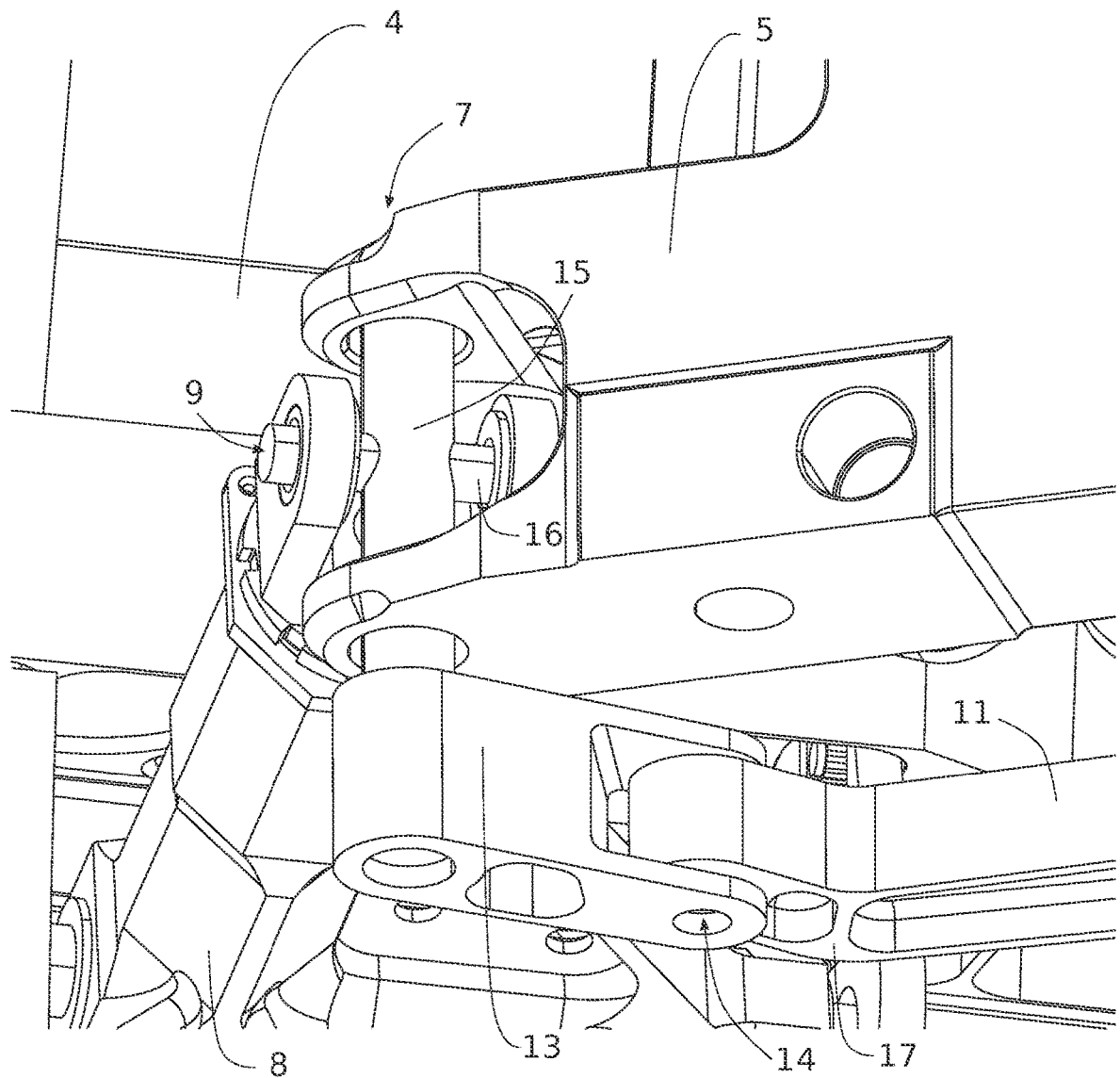
FIG. 3 is a view of a detail of FIG. 2.

FIG. 3 is a view of a detail of FIG. 2 showing the lever 13. The lever 13 comprises, at its opposite end from the fourth pivot connection 14, a main shaft 15 extending substantially vertically and forming the second pivot connection 7. As mentioned above, each tab 19A, 19B comprises a bore that cooperates with a shaft, the axis of which coincides with the axis of the second pivot connection 7. In the present example, one of these shafts (the one relating to the lower tab 19A) is formed by the main shaft 15.

The fourth pivot connection is realized by any means and, in the present example, by a clevis formed on the lever 13 that cooperates with an opening in the single connecting rod 11. A secondary shaft 16 is also fastened perpendicularly to the main shaft 15 in order to realize the pivot connection 9 between the lifting arm 8 and the hinge structure 5, these two shafts 15, 16 thus being arranged in a cross shape. The lever 13, the main shaft 15 and the secondary shaft 16 are advantageously made in one piece, for example by assembling standard components. This single piece provides the functions of the second pivot connection 7, the pivot connection 9 and the fourth pivot connection 14 in a compact manner and at a low cost.

The lever 13 is therefore the site of three pivot connections: the fourth pivot connection 14, the second pivot connection 7, and the pivot connection 9 with a substantially horizontal axis between the hinge structure 5 and the lower lifting arm 8.

Figure 4:
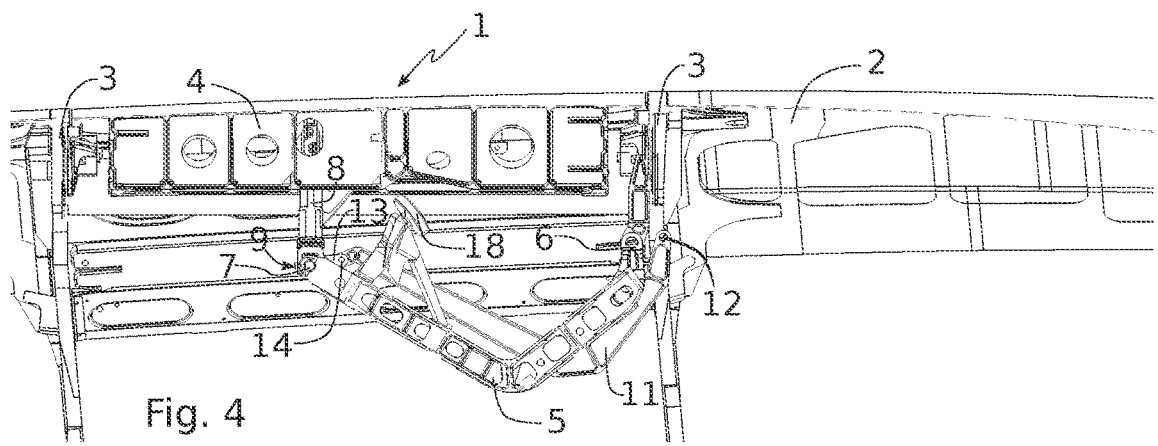
FIGS. 4 to 6 are top views showing three positions of the opening leaf of the door in FIGS. 1 and 2, in a closed position, a position in the process of opening, and an open position, respectively.
Figure 5:
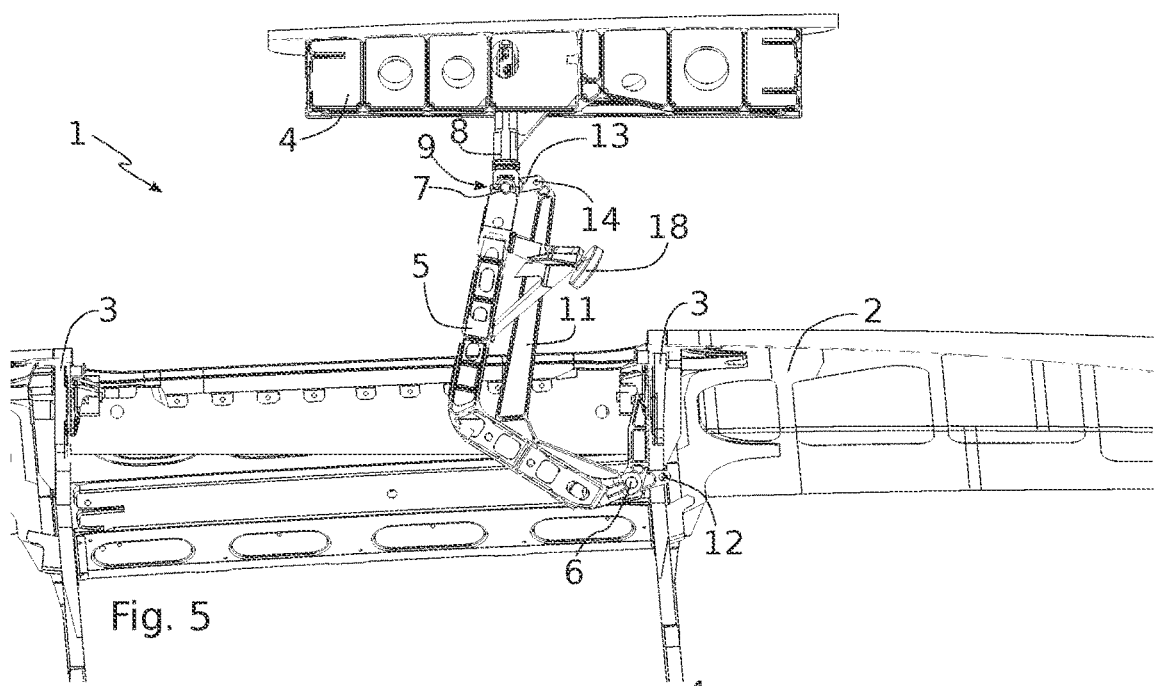
Figure 6:
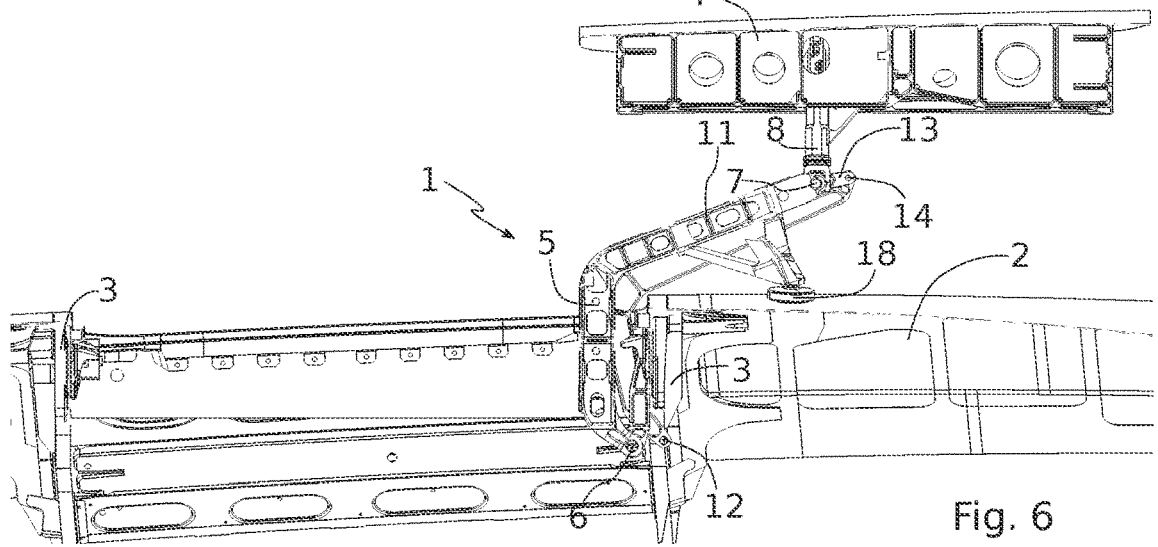

FIGS. 4 to 6 show the operation of the hinge structure 5 and of the circular-translation guide device during an opening or closing movement of the door 1. In FIG. 4, the door 1 is in the closed position, the opening leaf 4 being in position in the frame 3. This view shows that the first pivot connection 6 and the second pivot connection 7 are spaced apart from one another, meaning that they are not coaxial. The distance between these two pivot connections 6, 7 is in this case equal to the distance between the third pivot connection 12 and the fourth pivot connection 14 within the lever 13. The same applies to the distance between the first pivot connection 6 and the second pivot connection 7, which is equal to the distance between the third pivot connection 12 and the fourth pivot connection 14. In this way, a deformable parallelogram is created between these four pivot connections 6, 7, 12, 14.

Starting from the closed position in FIG. 4, when the door 1 is made to open, firstly the opening leaf 4 is made to move with a lifting movement (which cannot be seen in these top views) in a conventional manner in order to unlock the opening leaf 4, then the latter is pushed back toward the outside of the aircraft, as shown in FIG. 5. During this movement, the deformable parallelogram described previously keeps the orientation of the opening leaf 4 constant. The deformable parallelogram thus maintains the orientation of the lever 13, which itself maintains the orientation of the opening leaf 4 by virtue of the secondary shaft 16. The single connecting rod 11 is not affected by the lifting or lowering movements of the opening leaf 4.

FIG. 6 shows the completely open position of the door 1. The hinge structure 5 also comprises a buffer 17 forming an end stop which is positioned against the fuselage 2. In this open position, the opening leaf 4 is therefore positioned facing the fuselage of the aircraft and clears the frame 3 to allow passage. This passage is maximized by virtue of the fact that the single connecting rod 11 is retracted behind the profile of the hinge structure 5, such that the circular-translation guide device of the opening leaf 4 does not take up any additional free space relative to the hinge structure 5.

The bent shape, which is well known, for the hinge structure 5 makes it possible for the opening leaf 4 to move away from the frame 3 as much as possible to clear the passage. The single connecting rod 11 substantially reproduces this bent shape, which makes it possible to bypass the frame 3 while in the open position.

The shape of the single connecting rod 11 could have a number of angled sections that are necessary for bypassing the frame 3 depending on the shape and the thickness of this frame 3. However, the respective dimensions and shapes of the hinge structure 5, of the single connecting rod 11, and of the lever 13 need to be chosen such that, between the closed position and the open position, the first pivot connection 6, the second connection 7, the third pivot connection 12, and the fourth pivot connection 14 are not aligned, in order that the deformable parallelogram is not rendered unstable.

Figure 7:
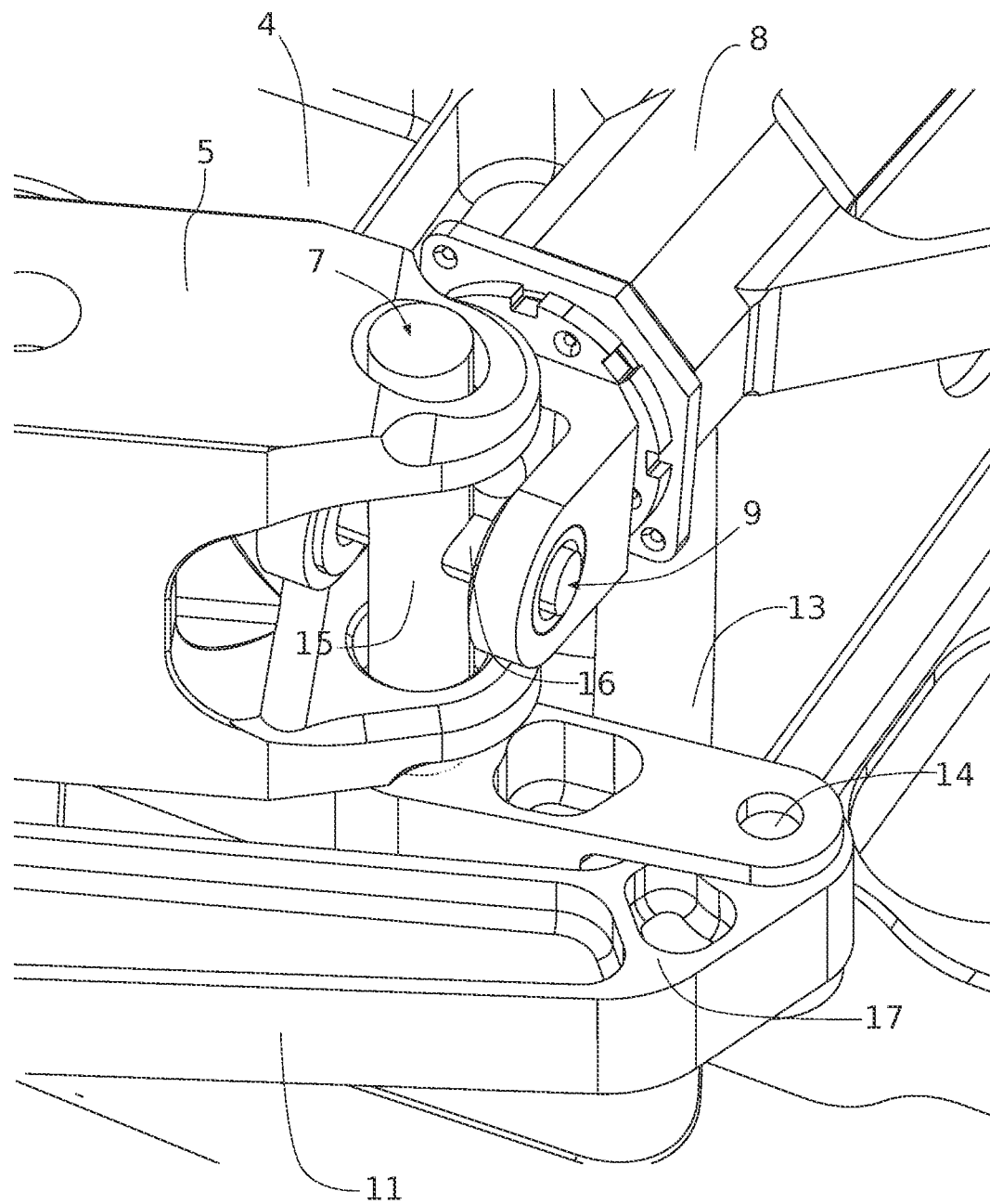
FIG. 7 is a view of a detail of FIG. 6.

FIG. 7 is a view of a detail of the lever 13 in the open position in FIG. 6. In the present example, the single connecting rod 11 comprises an angled end section 17 which makes it possible to use a compact lever 13 without the single connecting rod 11 butting against the lever 13.

In the description above, only the parts involved in the pivot connections connecting the opening leaf 4 to the frame 3 have been described, since the invention concerns the circular-translation device. The members for controlling the engaging and disengaging movements, and the opening and closing movements, of the door 1 are conventional and have not been described here.

Further variant embodiments of the aircraft door can be implemented without departing from the scope of the invention. For example, the pivot connections described are simple pivot connections realized by clevises that cooperate with a shaft, but may also include, for example, rolling bearings, friction rings or any other mechanical means relating to pivot connections.

Furthermore, the single connecting rod 11 and the lever 13 have been described as cooperating with the lower lifting arm 8 in the example; however, as a variant, the single connecting rod 11 can cooperate with the upper lifting arm 8 or another lifting arm, for example a central lifting arm if the device comprises more than two lifting arms 8.

The invention claimed is:

1. An aircraft door (1) comprising:
   an opening leaf (4);
   a frame (3) intended to be fastened to the fuselage (2) of the aircraft;
   a hinge structure (5) supporting the opening leaf (4) relative to the frame (3), the hinge structure (5) being connected on a first side to the frame (3) by a first pivot connection (6), and being connected on a second side to the opening leaf (4) by a second pivot connection (7), an axis of the first pivot connection (6) being parallel to an axis of the second pivot connection (7), the opening leaf (4) pivots relative to the hinge structure (5) via the second pivot connection (7) and the hinge structure (5) pivots on the frame (3) via the first pivot connection (6), such that the opening leaf (4) is movable between a closed position, in which the opening leaf (4) is in the frame (3), and an open position, in which the opening leaf (4) is open and positioned facing the fuselage (2) of the aircraft, clearing the opening of the frame (3);

a circular-translation guide device designed to maintain an orientation of the opening leaf (4) while it is opening or closing;

the aircraft door having:

the hinge structure (5) is connected to the opening leaf (4) via a lifting arm (8) which allows a lifting movement of the opening leaf (4) relative to the hinge structure (5);

the circular-translation guide device comprises a single connecting rod (11) connected to the frame (3) by one of its ends via a third pivot connection (12), the axis of which is parallel to the axis of the first pivot connection (6) and is separate from the axis, the single connecting rod (11) being connected by the other of its ends to a lever (13) by a fourth pivot connection (14), the axis of which is parallel to the axis of the first pivot connection (6) and to the axis of the third pivot connection (12);

the lever (13) is attached to the hinge structure (5) via the second pivot connection (7), by its opposite end from the fourth pivot connection (14);

the lever (13) extends in a first direction and comprises a first shaft (15) extending in a second direction which is parallel to the first direction and coincides with the axis of the second pivot connection (7), the hinge structure (5) being mounted on the first shaft (15) so as to be pivotable relative to the opening leaf (4);

the lever (13) comprises a second shaft (16) extending perpendicularly to the axis of the second pivot connection (7), the lifting arm (8) being mounted in a rotatable manner on the second shaft (16).

2. The aircraft door as claimed in claim 1, wherein the lifting arm (8) is connected to the opening leaf (4) by a pivot connection (10) perpendicular to the axis of the second pivot connection (7).

3. The aircraft door as claimed in claim 1, wherein the second shaft (16) is fastened to the first shaft (15), the first shaft (15) and the second shaft (16) being arranged in a cross shape.

4. The aircraft door as claimed in claim 1, wherein the hinge structure (5) comprises two tabs (19A, 19B), each equipped with a pivot (7A, 7B), these two pivots (7A, 7B) being aligned and forming the second pivot connection (7).

5. The aircraft door as claimed in claim 4, wherein the lever (13) cooperates with the one (7A) of said pivots (7A, 7B).

6. The aircraft door as claimed in claim 1, wherein a distance between the axis of the first pivot connection (6) and the axis of the third pivot connection (12) is equal to the distance between the axis of the second pivot connection (7) and the axis of the fourth pivot connection (14).

7. The aircraft door as claimed in claim 1, wherein the hinge structure (5) and the single connecting rod (11) each comprise a bend for avoiding the frame (3) when the opening leaf (4) is in the open position.

8. The aircraft door as claimed in claim 1, wherein the single connecting rod (11) comprises an angled section (17) at its end which is connected to the lever (13).

9. The aircraft door as claimed in claim 1, wherein the lever (13), the first shaft (15) and the second shaft (16) are made in one piece.

* * * * *